US009213046B2

(12) United States Patent  
Wang

(10) Patent No.: US 9,213,046 B2  
(45) Date of Patent: Dec. 15, 2015

(54) MICRO INERTIAL MEASUREMENT SYSTEM

(75) Inventor: Tao Wang, Guangdong (CN)

(73) Assignee: SZ DJI TECHNOLOGY CO., LTD., Shenzhen (CH)

(*) Notice: Subject to any disclaimer, the term of this patent is extended or adjusted under 35 U.S.C. 154(b) by 365 days.

(21) Appl. No.: 13/809,407

(22) PCT Filed: Dec. 6, 2010

(86) PCT No.: PCT/CN2010/079483  
§ 371 (c)(1),  
(2), (4) Date: Jan. 9, 2013

(87) PCT Pub. No.: WO2011/140804  
PCT Pub. Date: Nov. 17, 2011

(65) Prior Publication Data  
US 2013/0111993 A1 May 9, 2013

(30) Foreign Application Priority Data

Aug. 9, 2010 (CN) .......................... 2010 1 0250948

(51) Int. Cl.  
G01P 1/02 (2006.01)  
G01P 15/18 (2013.01)  
(Continued)

(52) U.S. Cl.  
CPC .................. *G01P 15/14* (2013.01); *F16F 15/04* (2013.01); *G01C 21/16* (2013.01); *G01P 1/02* (2013.01); *G01P 15/18* (2013.01)

(58) Field of Classification Search  
CPC ........... G01P 1/023; G01P 15/18; G01P 1/00; G01P 1/02; G01P 15/08; G01C 21/16  
USPC ............. 73/493, 431, 510, 511; 702/145, 151  
See application file for complete search history.

(56) References Cited

U.S. PATENT DOCUMENTS 5,239,866 A 8/1993 Froidevaux  
5,433,110 A * 7/1995 Gertz et al. ................. 73/514.35  
(Continued)

FOREIGN PATENT DOCUMENTS

CN 1322312 C 6/2007  
CN 100381785 C 4/2008  
(Continued)

OTHER PUBLICATIONS

"Design,Fabrication and Testing of Miniaturised Wireless Inertial Measurement Units (IMU)" J Barton et al, 2007 Electronic Components and Technology Conference, pp. 1143-1148. Published Dec. 31, 2007.

(Continued)

*Primary Examiner* — Helen Kwok  
(74) *Attorney, Agent, or Firm* — Wilson Sonsini Goodrich & Rosati

(57) ABSTRACT

A micro inertial measurement system includes a housing, a sensing module, and a damper. The sensing module includes a rigid sensing support, a measuring and controlling circuit board mounted on the rigid sensing support and an inertial sensor set on the measuring and controlling circuit board. The inertial sensor includes a gyroscope and an accelerometer. The sensing module is mounted in the housing. The damper is mounted in the housing and set in the gap between the sensing module and the inside wall of the housing. By use of the above-mentioned structure, the noise immunity of the inertial measuring system can be greatly improved, and the volume and weight of the inertial measuring system can be greatly reduced.

44 Claims, 5 Drawing Sheets

(51) Int. Cl.
*G01P 15/14* (2013.01)
*G01C 21/16* (2006.01)
*F16F 15/04* (2006.01)

(56) References Cited

U.S. PATENT DOCUMENTS

| | | | |
|---|---|---|---|
| 6,195,261 B1* | 2/2001 | Babutzka et al. | 361/752 |
| 6,918,297 B2* | 7/2005 | MacGugan | 73/504.15 |
| 7,040,922 B2* | 5/2006 | Harney et al. | 439/527 |
| 7,370,530 B2* | 5/2008 | DCamp et al. | 73/493 |
| 7,404,324 B2 | 7/2008 | Braman et al. | |
| 7,467,552 B2* | 12/2008 | MacGugan | 73/493 |
| 7,536,909 B2* | 5/2009 | Zhao et al. | 73/493 |
| 7,814,791 B2* | 10/2010 | Andersson et al. | 73/504.03 |
| 8,037,754 B2* | 10/2011 | Eriksen et al. | 73/493 |
| 8,266,960 B2 | 9/2012 | Braman et al. | |
| 8,552,350 B2 | 10/2013 | Bielas et al. | |
| 8,640,541 B2 | 2/2014 | Abdel Aziz et al. | |
| 8,646,331 B2 | 2/2014 | Ohl et al. | |
| 8,960,000 B2* | 2/2015 | Sakuma et al. | 73/431 |
| 2003/0070483 A1* | 4/2003 | Mueller | 73/493 |
| 2004/0169244 A1 | 9/2004 | MacGugan | |
| 2007/0032951 A1* | 2/2007 | Tanenhaus et al. | 701/220 |
| 2007/0113702 A1 | 5/2007 | Braman et al. | |
| 2009/0255335 A1* | 10/2009 | Fly et al. | 73/493 |
| 2009/0308157 A1 | 12/2009 | Eriksen et al. | |
| 2010/0037694 A1 | 2/2010 | Grossman | |
| 2010/0059911 A1 | 3/2010 | Goepfert et al. | |
| 2013/0110325 A1 | 5/2013 | Sapp, II et al. | |

FOREIGN PATENT DOCUMENTS

| | | |
|---|---|---|
| CN | 101290227 A | 10/2008 |
| CN | 101349564 A | 1/2009 |
| CN | 101532840 | 9/2009 |
| CN | 201408009 Y | 2/2010 |
| CN | 101750065 A | 6/2010 |
| CN | 101922938 B | 6/2012 |
| CN | 202274882 U | 6/2012 |
| CN | 102778232 A | 11/2012 |
| CN | 102980584 A | 3/2013 |
| CN | 203037259 U | 7/2013 |
| CN | 103411615 A | 11/2013 |
| DE | 4136355 A1 | 5/1993 |
| DE | 602004006270 T2 | 1/2008 |
| EP | 1642365 B1 | 5/2007 |
| EP | 2154393 A2 | 2/2010 |
| EP | 2752643 A1 | 7/2014 |
| JP | 07-306047 | 11/1995 |
| JP | 2002/195834 | 10/2002 |
| WO | WO 03/029756 A1 | 4/2003 |
| WO | WO 2004/079874 A1 | 9/2004 |
| WO | 2009/129066 | 10/2009 |
| WO | WO 2013/029286 A1 | 3/2013 |

OTHER PUBLICATIONS

International search report dated May 5, 2011 for PCT/CN2010/079483.
U.S. Appl. No. 14/390,008, filed Oct. 1, 2014, Song.
International search report and written opinion dated Feb. 6, 2015 for PCT/CN2014/076296.

* cited by examiner

MICRO INERTIAL MEASUREMENT SYSTEM

CROSS REFERENCE TO RELATED PATENT APPLICATION

The present application is the US national stage of PCT/CN2010/079483 filed on Dec. 6, 2010, which claims the priority of the Chinese patent application No. 201010250948.4 filed on Aug. 9, 2010, which application is incorporated herein by reference.

FIELD OF THE INVENTION

The present invention relates to strapdown inertial navigation technology used in carriers such as unmanned aerial vehicle (UAV). More particularly, the present invention relates to a micro inertial measurement system used in strapdown inertial navigation.

BACKGROUND OF THE INVENTION

At present, strapdown inertial navigation is a type of booming and advanced navigation technology, Wherein, inertial elements including a gyroscope, an accelerometer and so on which are fixed to a carrier are directly uses for measuring an acceleration of the carrier relative to an inertial reference system. Then the information on the speed, attitude angle and position in a navigation coordinate system can be achieved by an integral operation based on the Newton law of inertia, so as to guide the carrier from a start point to a destination. Besides, in the strapdown inertial navigation technology, mathematical operations comprising coordination transformation and differential equation solution on measured data by the gyroscope and the accelerometer are conducted by a control computer, in order to extract the attitude data and navigation data from elements in an attitude matrix to finish the navigation mission. In the strapdown inertial navigation system, a "mathematical platform" built based on updated data such as an updated strapdown matrix is in place of a traditional electromechanical navigation platform so as to achieve a simplified system structure, significantly reduced system volume and cost as well as inertial elements easy to install and maintain. Moreover, the strapdown inertial navigation system is independent of external system support, thus obtaining the information about attitude, speed and position on its own. It doesn't radiate any information to outside neither. Therefore, due to its advantages such as being real-time, independent, free of interruption, free from limitations of region, time and weather condition, as well as of comprehensive output parameters, it is widely applies in plurality of fields including aviation, sailing and traffic etc.

The strapdown inertial navigation system is usually composed of one inertial measurement system, one control computer, a control display and associated supporting components, wherein the inertial measurement system is the key component for such overall system. The inertial measurement system is equipped with a gyroscope and an accelerometer, and its operation principle is as follows: at first, triaxial angular speed of a carrier is detected by the gyroscope, and linear acceleration of a vehicle moving along the tri-axes is detected by the accelerometer; after that, in order to calculate some voyage attitude information such as instantaneous heading and inclination angle, the signal of angular speed detected by the gyroscope is subjected to an integral operation with respect to time by the control computer on one hand; on the other hand, the signal of acceleration detected by the accelerometer is subjected to an integral operation with respect to time so as to calculate the instantaneous velocity information; finally, a secondary integration is carried out to calculate the distance and position in the voyage during this period of time.

The inertial measurement system and its attitude solution technology are the key technical links that have an impact on properties of the strapdown inertial navigation system. This is because such inertial measurement and its attitude solution are the premises for controlling the track of the carrier. Thus, their precision and efficiency have a direct influence on the aging and precision of the navigation. Secondly, since the inertial measurement system has to bear vibration, impact and angular motion directly in a rigorous pneumatic environment, it is easy to bring about many destabilization effect and error effect, thereby becoming a weak link of the strapdown inertial navigation system. Thirdly, there are some challenges such as micromation and industrialization for the strapdown inertial navigation system. In particular, with the development of microelectronic technology, it is required to employ micro electromechanical inertial components with intermediate precision or even low precision for the purpose of producing such strapdown inertial navigation product with low cost and in batches.

When the carrier tends to miniaturization and micromation, since its foundation mass is much smaller than that of a conventional carrier, it will subject to more excitation and random vibration in the voyage dynamic environment and become more instable compared with the conventional carrier. Accordingly, in order to overcome the drawbacks of instable navigation, reduced precision and even shortened service life of electronic components, some targeted technical measures which are mainly in the aspects of mechanical structure, damping design and micro technology have to be proposed for the inertial measurement system.

FIG. 1 is a structure diagram for an inertial measurement system employed in a strapdown inertial navigation system of a small-sized UAV in the prior art. Wherein, a sensing support 11 is fastened to the interior of a housing 12 through a fastening screw, a damping unit 13 is formed by four rubber blankets, and the housing is fixed to a vehicle at its bottom. The sensing support is composed of three pieces of gyro circuit board 111, 112 and 113 perpendicular to each other (referring to FIG. 2), on which are arranged three one-axis gyroscope 111a, 112a and 113a, respectively. The gyro circuit board 111 in the horizontal position is a combined one. It is further provided with a triaxial accelerometer 111b besides the gyro 111a. These three gyroscopes should be installed on three orthogonal planes with their sensing axes perpendicular to each other to form an orthogonal coordinate system for measurement. On the combined gyro circuit board 111, the measuring axis of the tri-axial accelerometer 111b is in parallel with that of the gyro 111a. The combined gyro circuit board 111 is in direct connection with a conditioning circuit board 114 and a master processor circuit board 115 through a connector.

FIG. 3 illustrates an equivalent analysis for the damping structure of the above mentioned inertial measurement system. In the figure, a mass block M represents the inertial measurement system and its centre of mass is the m; the damping unit is indicated by $\{K_i, c_i\}$, wherein the $K_i$ stands for rigidity, the $C_i$ stands for damping coefficient, and the subscript i stands for the number of the damping unit contained in a damper; since four rubber blankets are used as the damping units in the FIG. 1, i is equal to 1, 2, 3 and 4; B indicates a voyage carrier and P is the elastic centre of the damper. When the carrier B is during voyage, foundation excitation is produced for the inertial measurement system M. At this moment, in order to reduce the impact of the vibration of the carrier B onto the inertial measurement system M, the damping unit {$K_i, c_i$} absorbs and consumes the forced vibration energy from the carrier B, and it starts an elastic movement up and down while taking the point P as a centre.

There are some problems for the above mentioned inertial measurement system:

(1) the sensing support is composed of three circuit boards separated from each other, thus taking up too much space and resulting in significant differences among the rigidity on the three axial directions;

(2) since the damping units are installed outside of the inertial measurement system, they take up extra space; more importantly, when the inertial measurement unit is forced to vibrate, it is easy to have torsional vibration due to unbalanced rigidity and irrational mechanical structure;

(3) for the damper, its ideal sphere of action is limited to one-axis direction, that is, it can only attenuate the vibration from the vertical direction while having no effective suppression on the vibration from any other directions; as a result, linear vibration and angular vibration in different degrees of freedom can be coupled together and the damping band becomes narrow.

SUMMARY OF THE INVENTION

Aiming at the above mentioned drawbacks in the prior art, the objective of the present invention is to solve the problems that the traditional inertial measurement system takes up too much space, it is easy to have torsional vibration and its damping frequency band is relatively narrow.

The technical solution for solving the above mentioned technical problems is as follows: a micro inertial measurement system is provided, comprising a housing, a sensing module and a damper; wherein the sensing module includes a rigid sensing support, a measuring and controlling circuit board mounted on the sensing support and an inertial sensor set on the measuring and controlling circuit board; the inertial sensor includes a gyroscope and an accelerometer; the sensing module is received in the housing; the damper is received in the housing and set in the gap between the sensing module and an inside wall of the housing.

In an advantageous solution of the present invention, the sensing support is a rigid support in the shape of cube and a groove is engraved on at least one of its surfaces; the measuring and controlling circuit board is a flexible measuring and controlling circuit board; at least a portion of circuit components on the flexible measuring and controlling circuit board is embedded in the groove on at least one surface.

In an advantageous solution of the present invention, six surfaces of the sensing support are all engraved with the groove; the number of the flexible measuring and controlling circuit board is up to six, and the flexible measuring and controlling circuit boards cover the surfaces of the sensing support respectively; the circuit components on each flexible measuring and controlling circuit board are embedded in the groove on the surface of its corresponding sensing support so as to make the flexible measuring and controlling circuit board cover each surface of the sensing support smoothly.

In an advantageous solution of the present invention, the sensing module also includes an anti-aliasing circuit and an A/D switching circuit set on the flexible measuring and controlling circuit board; the inertial sensor includes three gyroscopes and one accelerometer; such circuit modules in total are arranged on the flexible measuring and controlling circuit boards, respectively.

In an advantageous solution of the present invention, the flexible measuring and controlling circuit boards are integrated together to form a unitary structure, and they cover each surface of the sensing support completely after they have bent by an angle of 90° along the edges of the sensing support.

In an advantageous solution of the present invention, the damper includes at least two damping units that are arranged in the gap between one surface of the sensing module and the inside wall of the housing. Wherein, it is preferred that the damper comprises up to six damping units.

In an advantageous solution of the present invention, the sensing module is hung at the centre of an inner cavity of the housing by up to six damping units, and the elastic centre P of the damper is coincident with the centroidal m of the sensing module.

In an advantageous solution of the present invention, the housing includes an upper housing with an opening at its lower part and a lower cover fit for the opening.

Due to the above mentioned technical solutions, the present invention has the following advantages: (1) not only the rigidity for the support is increased, but also the system mechanical structure is improved, as a result, the equal-rigidity vibration reduction in three dimensions is achieved, so that the noise immunity of the inertial measurement system can be greatly improved; (2) the vibration characteristics of the inertial measurement system is improved so that its inherent frequency is significantly distinguished from the operating frequency of sensitive components such as a shaker of the gyroscope; as a result, the relative amplitude for a mounting surface of the inertial sensor is reduced to be smallest; (3) the volume and weight of the inertial measurement system can be greatly reduced to expand the load space of the carrier.

DETAILED DESCRIPTION OF THE PREFERRED EMBODIMENT

Figure 1:
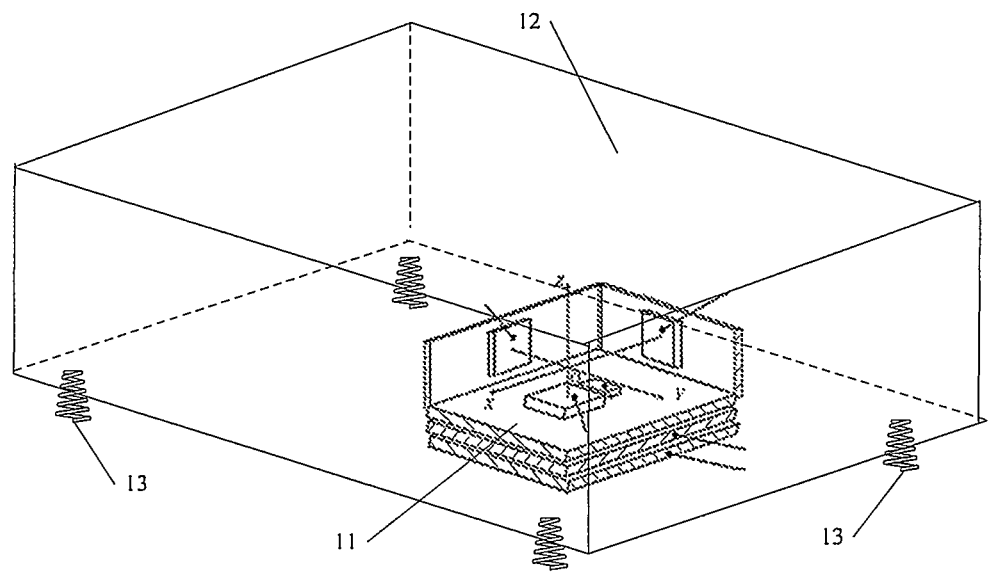
FIG. 1 is a structure diagram for a strapdown inertial measurement system of a small-sized UAV in the prior art.
Figure 2:
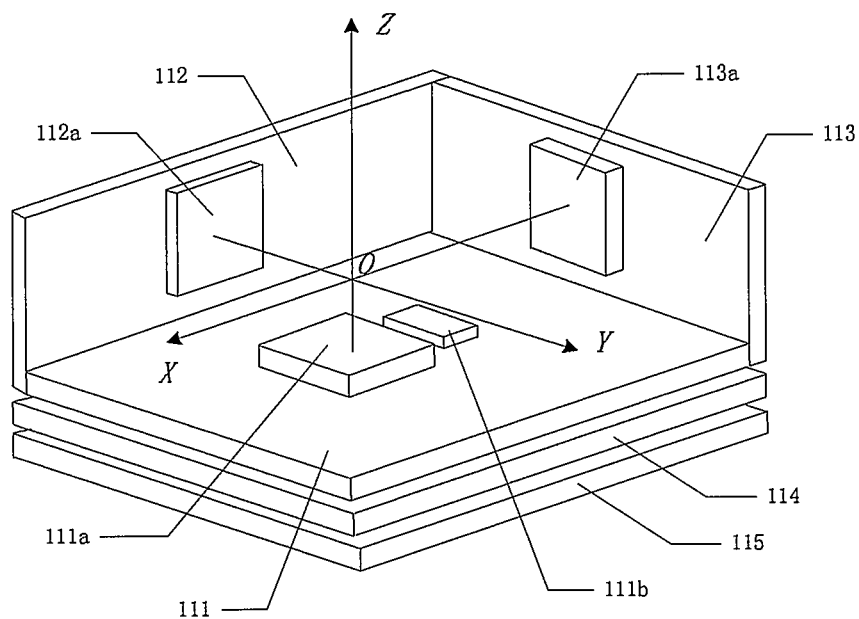
FIG. 2 is a structure diagram for a sensing support in the inertial measurement system of FIG. 1.
Figure 3:
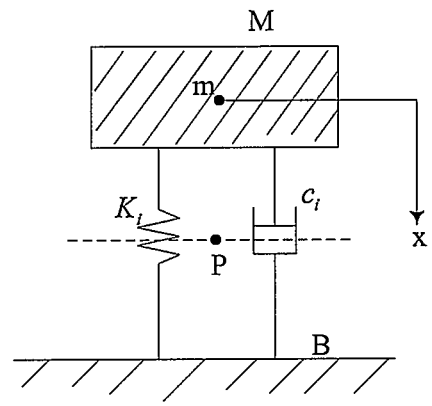
FIG. 3 is a schematic diagram for an equivalent model of a damper in the inertial measurement system of FIG. 1.
Figure 4:
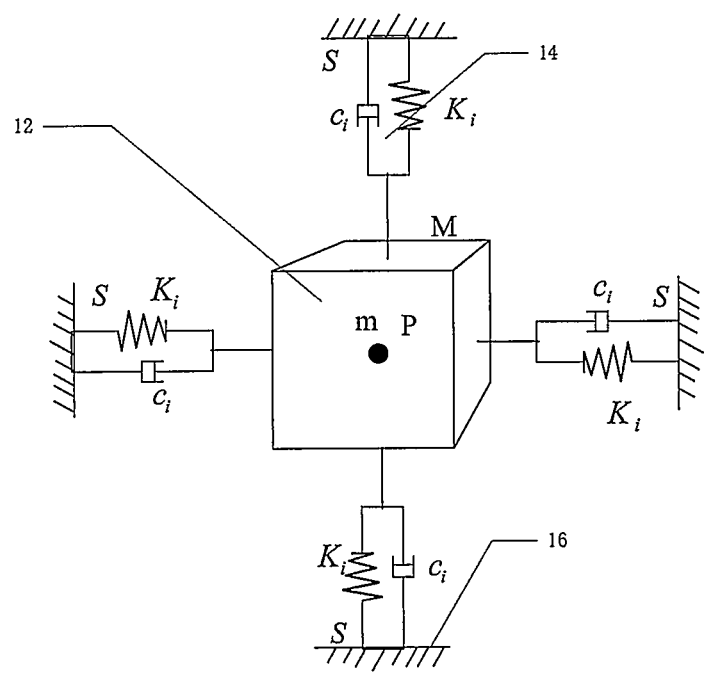
FIG. 4 illustrates the distribution of internal damping units of a damper in one embodiment of the present invention; wherein the S in the figure stands for an upper, a lower, a left and a right inside wall of a housing.
Figure 5:
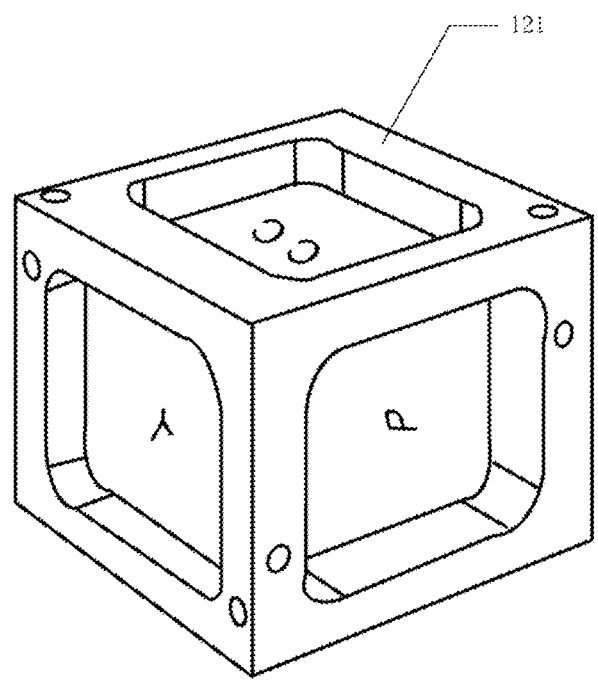
FIG. 5 is a schematic diagram for a sensing support in a preferred embodiment of the present invention.

During operation, in the mechanical environment for a strapdown inertial navigation system, the violent random vibration may often present. The vibration may induce instability of the system and damage to electronic components, which will impact on the system stability greatly. In order to reduce such impact produced by the violent random vibration of a carrier, which may damage electronic components or make an inertial measurement unit unstable, except that the connection stiffness between respective sensor circuit boards is strengthened, the inertial measurement unit is elastically connected to the carrier using a damper as a damping medium, so as to realize a desired damping effect. Since the selection of a damping mode influences both damping performance and measurement precision of the inertial navigation system, it is always an important link in its structure design. In various aspects of the present invention, an improved design of sensing support and a rational damping mechanical structure may be operable to improve the performance of the micro inertial measurement system.

The sensing support is a key component for mounting a gyroscope, a measuring and controlling circuit board and a connecting wire. The sensing support may suffer a variety of violent vibration during operation, in which case a mounting surface for the gyroscope has the relative maximum amplitude. Therefore, dynamic properties for the structure of the mounting surface will definitely impact on the operating reliability and accuracy of the gyroscope. To minimize such impact, it is required to possess a certain static strength, anti-vibration strength and fatigue life. With respect to process, the support is required to be easy to mount and manufacture. Besides, the structure for the support is designed rationally as well as its rigidity and damping performance are improved, so that its inherent frequency is definitely significantly distinguished from the operating vibration frequency of a shaker of the gyroscope and the relative amplitude for the mounting surface of the gyroscope is minimized. In the prior art, a traditional method for optimizing the support is shown as follows: wall thickness is greatly increased to enhance the rigidity and increase the inherent frequency of the corresponding structure. In the present invention, the structural design is improved by optimizing material, shape and joint surface, instead of increasing thickness unilaterally, so as to enhance the structural rigidity and damping performance of the support. In addition, the conditionality between the support and a damping device should be resolved on the whole. The mounting position and the line route of the measuring and controlling circuit board on the support are also in the consideration.

It can be seen from the above description that, in order to overcome the above mentioned technical drawbacks for the inertial measurement system in the prior art, the following technical measures is taken in the present invention: a micro inertial measurement system is provided based on the concept of improving its mechanical structure, wherein the system has a greatly reduced volume and includes a damping structure with three-dimensional equal rigidity; the micro inertial measurement system is provided in such a way that harmful effects of various drawbacks including three-dimensional unequal rigidity, resonance excitation and torsional vibration on the strapdown inertial navigation system are overcome.

A preferred embodiment of the present invention is shown in FIGS. 4-10. Such micro inertial measurement system comprises a sensing module 12, a damping unit, an upper housing 16 and a lower cover 18.

Wherein, the sensing module 12 comprises a sensing support 121, an inertial sensor 122 and a flexible measuring and controlling circuit board 123. In this embodiment, the sensing support 121 is a rigid and cube-shaped support satisfying certain requirements of specific gravity and rigidity. And the sensing support 121 is engraved with a groove on its respective surface.

The inertial sensor 122 comprises a gyroscope and an accelerometer. In particular, it comprises three gyroscopes and one accelerometer, all of which are welded onto the flexible measuring and controlling circuit board 123.

The flexible measuring and controlling circuit board 123 should have a function of preprocessing sensor signals. For this purpose, such flexible measuring and controlling circuit board 123 should comprise at least an anti-aliasing circuit and an A/D switching circuit. On one hand, a circuit board and connecting wire are made of flexible material to withstand the bending of 90°. On the other hand, the shape of the flexible measuring and controlling circuit board should be congruent to that of the developed plane of the sensing support, so that they can cover each surface of the sensing support completely and smoothly after they are bent by an angle of 90° along the edges of the sensing support.

In certain implementation, six circuit modules composed of the anti-aliasing circuit, the A/D switching circuit, the three gyroscopes and the one accelerometer are arranged on six flexible measuring and controlling circuit boards, respectively. Moreover, the circuit components on each flexible measuring and controlling circuit board are respectively embedded in the groove on its corresponding surfaces of the sensing support.

An inner cavity that is formed by the upper housing 16 and the lower cover 18 should have a shape similar to the configuration of the sensing module 12, and the volume of the inner cavity is relatively larger than that of the sensing module 12. As a result, respective space formed between each inside wall of the housing and the corresponding plane of the sensing module is approximately the same to each other, in which is installed an internal damping units 14.

The internal damper is composed of a number of internal damping units $\{K_i, c_i\}$ 14 with appropriate damping properties. Such internal damping units are mounted between the inside wall S of the upper housing 16 and the six planes of the sensing module 12. The number of the internal damping units is determined depending on the vibration characteristics of different carriers, the maximum of which is 6. The sensing module is hung at the centre of the inner cavity of the housing. In this arrangement, the respective force axis of deformation for each internal damping unit is orthogonal to each other, and the elastic centre P of the damper coincides with the centroidal m of the sensing module, so that the forced vibration from the carrier is absorbed and consumed uniformly. In specific implementation, the damping unit is made of elastic matter with certain damping effect. Such elastic matter may be selected from but not limited to spring, rubber blanket, silica gel, sponge or any other damping matter.

In a preferred embodiment of the present invention, the sensing support 121 in the shape of a cube is made of metal material or non-metal material with a certain gravity and rigidity and manufactured using an integral forming process. The integral forming instead of assembling for a sensing support 121 is employed to ensure that rigidity of the support itself is enough to reduce measurement error caused by insufficient rigidity and anisotropy (referring to FIG. 5).

Figure 6:
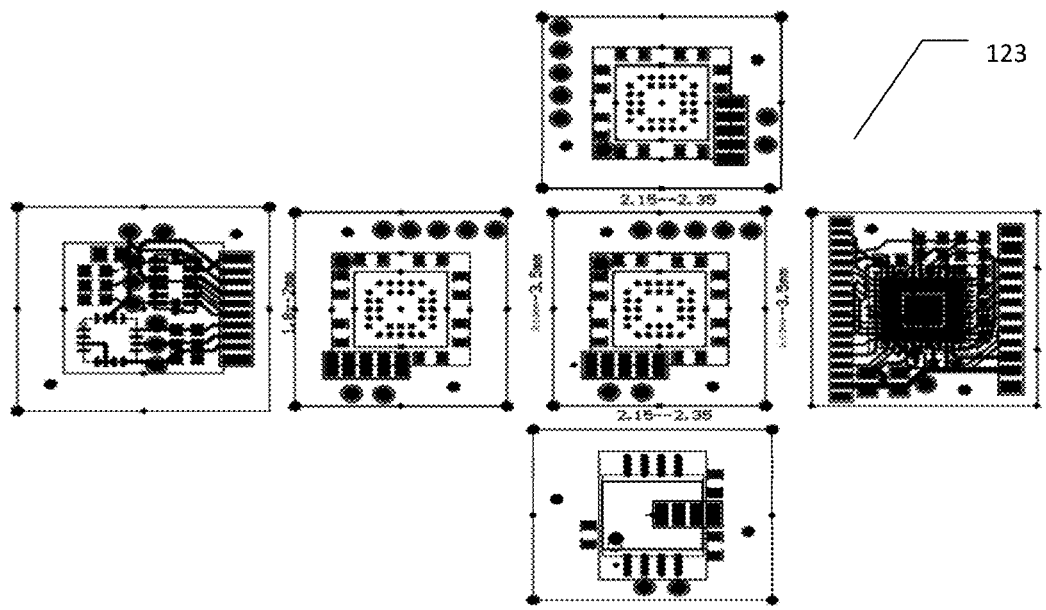
FIG. 6 is an outline view for a flexible measuring and controlling circuit board and an arrangement diagram for components on the flexible measuring and controlling circuit board; wherein the flexible measuring and controlling circuit board cooperates with the sensing support in the FIG. 5.

FIG. 6 is a schematic diagram illustrating the developed plane of a flexible measuring and controlling circuit board 123 and an arrangement for components thereon, according to a preferred embodiment of the present invention. The circuit substrate and the connecting wire of the flexible measuring and controlling circuit board 123 are both made of flexible material to withstand bending of 90°. Besides, its shape is designed to be congruent to that of the developed outer plane of the sensing support, such that the flexible measuring and controlling circuit board has six developed planes. Sensors and any other electronic components are respectively welded in appropriate positions on the front side of the six developed planes.

Figure 7:
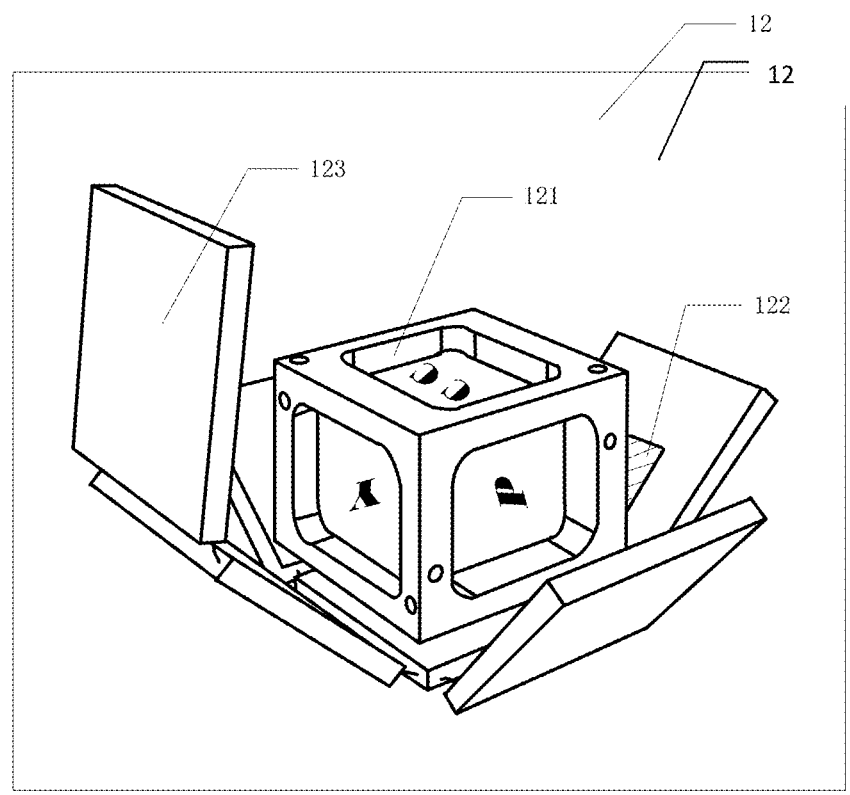
FIG. 7 is a schematic diagram for the composition of a sensing module in a preferred embodiment of the present invention.

FIG. 7 is a schematic diagram illustrating the structure of a sensing module in a preferred embodiment of the present invention. An inertial sensor 122 and any other electronic components are welded on the front side of the flexible measuring and controlling circuit board 123. The front side of the flexible measuring and controlling circuit board is attached to the sensing support 121 and bends by an angle of 90° along the edges of the sensing support. Then each sensor or electronic component is embedded into the groove on each surface of the sensing support. After that, the back side of the whole flexible measuring and controlling circuit board directs outward. Such that, the flexible measuring and controlling circuit board can enclose the sensing support together with the sensing component and electronic component therein, as well as cover each surface of the sensing support completely and smoothly.

In the present invention, the primary consideration for designing the strapdown inertial navigation damping system is how to avoid or reduce coupled vibration. If the mechanical structure of such system is irrational, the respective vibration in its six degrees of freedom will be coupled to each other, so as to produce a cross excitation of a linear vibration and an angular vibration. As a result, the detected data of the inertial measurement system would contain cross excitation information of its own, consequently a pseudo movement signal would be introduced into the system, which may significantly impact the measurement precision of the inertial navigation system. In order to reduce the interference produced by the damper during the measurement of angular motion of the system, the angular vibration frequency of the damping system should be significantly distinguished from the measuring bandwidth of the inertial navigation system. In the circumstances of broad-band random vibration, the lower the damping frequency is, the higher the damping efficiency is.

Figure 8:
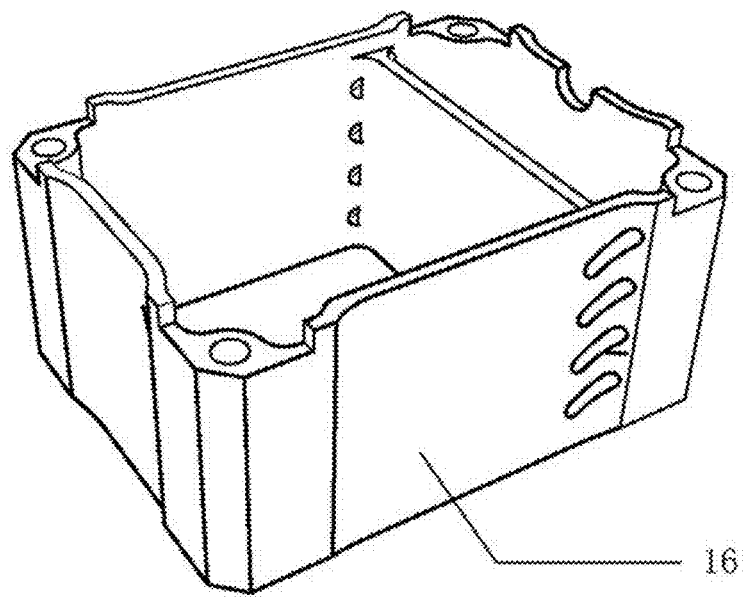
FIG. 8 is a structure diagram for a housing that cooperates with the sensing module in the FIG. 7.

FIG. 8 is a schematic diagram illustrating a housing 16 in a preferred embodiment of the present invention; wherein the housing 16 forms an inner cavity in the shape of cube together with a lower cover 18 (not shown in the figure for clarity). The inner cavity is used for holding the sensing module 12 and the damping units 14. In this case, compared with the shape of the sensing module 12, the inner cavity of the housing formed as mentioned above is designed to have the same shape, i.e. in the shape of cube, and have a relative larger volume. Upon such design, the respective space formed between each of the six inside walls of the housing and the corresponding one of the six outer surfaces of the sensing module has a nearly same shape and size to each other; wherein, the six inside walls of the housing are formed by the upper housing 16 and the lower cover 18. When the damping units 14 with approximately the same shape respectively are mounted in the space, an assembly of internal damper is completed, so as to provide relatively excellent damping effect.

Figure 9:
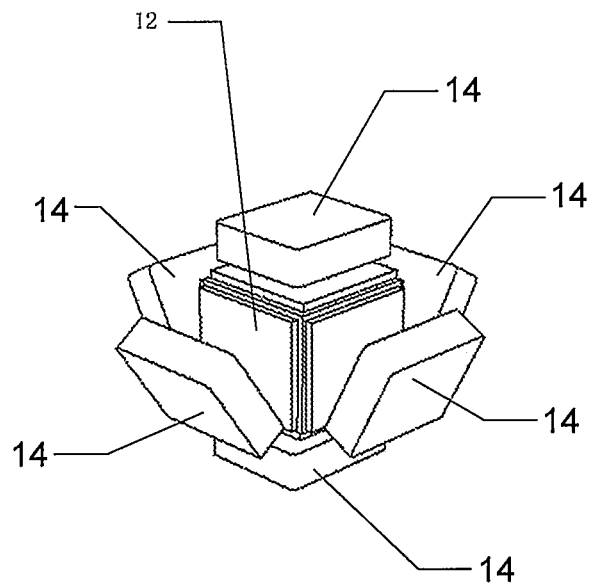
FIG. 9 illustrates the position relation between an internal damping unit and a sensing module that are employed in a preferred embodiment of the present invention.

FIG. 9 illustrates a position relation between an internal damper composed of all internal damping units 14 and a sensing module according to a preferred embodiment of the present invention. In the embodiment, in order to effectuate an effective attenuation or a complete absorption of the forced vibration on the sensing module 12 in the six degrees of freedom comprising front and back, right and left, and up and down degrees of freedom, six internal damping units 14, i.e. six damping pads of the same shape are mounted between the inside wall of the upper housing 16 and the sensing module 12; besides, the sensing module is hung at the centre of the inner cavity of the housing, and the respective force axis of deformation for each internal damping unit is orthogonal to each other, so that the forced vibration from the carrier is absorbed and consumed uniformly.

Figure 10:
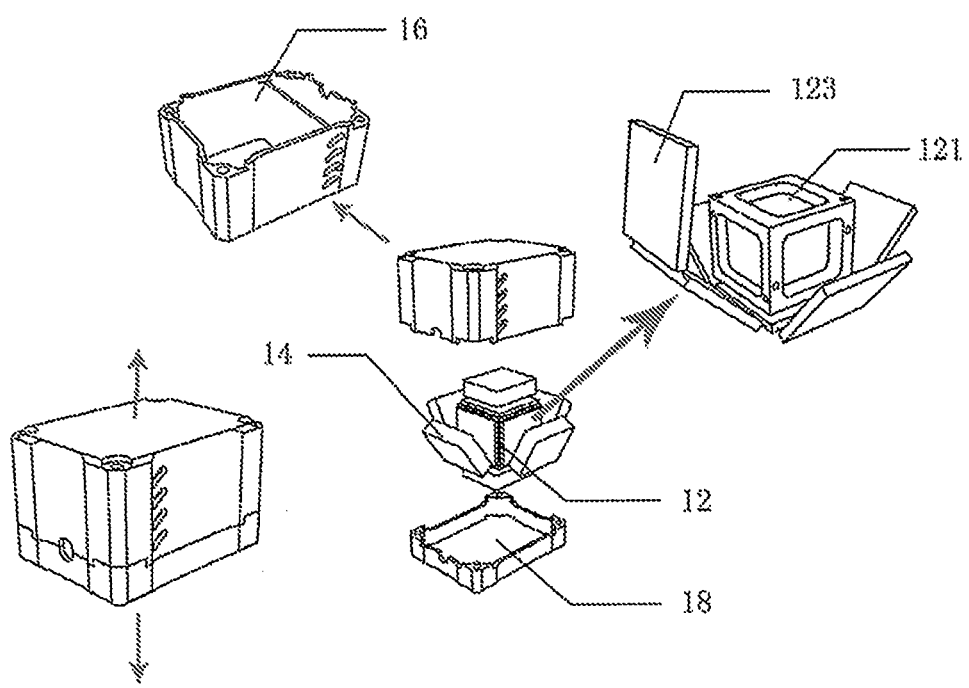
FIG. 10 is an assemblage diagrammatic sketch for a micro inertial measurement system in a preferred embodiment of the present invention.

FIG. 10 is an assemblage diagrammatic sketch for a micro inertial measurement system 2.1 in a preferred embodiment of the present invention. Due to a series of technical measures mentioned above, it is ensured that all of the inherent frequency, damping coefficient, damping efficiency and mechanical strength of the damper can meet the requirement of impact and vibration resistance. Such that, in the three coordinate systems of the micro inertial measurement system, i.e. an elastic coordinate system, an inertial coordinate system and a solution coordinate system, their respective corresponding coordinate axes are in parallel with each other, and the centroidal of the measurement system is coincident with the elastic centre of the damping device. In such optimal state, significant decoupling effect is achieved among vibrations in each degree of freedom, and the respective inherent frequency is approximate to each other to implement a technical effect of narrow frequency distribution.

The micro inertial measurement system of the present invention can be applied for UAVs, automatic driving aircraft, watercraft and underwater automatic detection equipment or various cars and robots and so on. Apart from the embodiments above, there are some other implementations for the present invention. For example, (1) the housing is not limited to be formed by the coordination between the upper housing and the lower cover; instead, it can be formed by the coordination between a lower housing and an upper cover or between a middle housing and an upper cover as well as a lower cover; (2) integrated processing can be performed on all or portions of the six functional modules of the flexible measuring and controlling circuit board, so that the number of the flexible measuring and controlling circuit board can be reduced to be less than six, and the number of the groove on the surface of the sensing support can be correspondingly reduced as well; (3) the support can be in the shape of cuboid and the structure of the circuit board is adjusted accordingly at this moment. It can be seen that all relevant and equivalent alternative technical solution should be within the scope of protection claimed by the present invention.

What is claimed is:

1. An inertial measurement device, the device comprising:
a sensing module comprising a support structure and a flexible inertial sensor, wherein the support structure comprises a plurality of external surfaces facing away from one another, and wherein the flexible inertial sensor is configured to wrap around the plurality of external surfaces of the support structure, such that the flexible inertial sensor substantially covers the plurality of external surfaces of the support structure, and wherein the flexible inertial sensor comprises one or more accelerometers and one or more gyroscopes.

2. The device of claim 1, wherein the flexible inertial sensor comprises one accelerometer and three gyroscopes.

3. The device of claim 1, wherein the flexible inertial sensor comprises a front surface configured to support the one or more accelerometers and one or more gyroscopes and a back surface opposite the front surface, and wherein the flexible inertial sensor wraps around the plurality of external surfaces of the support structure with the front surface facing the support structure and the back surface facing away from the support structure.

4. The device of claim 1, wherein the support structure comprises a plurality of grooves and each of the one or more accelerometers and the one or more gyroscopes is received within a respective groove of the plurality of grooves when the flexible inertial sensor is wrapped around the plurality of external surfaces of the support structure.

5. The device of claim 1, further comprising a housing containing therein said sensing module.

6. The device of claim 5, wherein the housing comprises a plurality of separable portions.

7. The device of claim 5, further comprising one or more damping units arranged between the sensing module and the housing.

8. The device of claim 7, wherein the flexible inertial sensor comprises a flexible circuit board, and wherein the one or more accelerometers and the one or more gyroscopes are each coupled to the flexible circuit board.

9. The device of claim 8, wherein the flexible circuit board comprises a plurality of panels, the flexible circuit board being foldable such that at least a subset of the plurality of panels are orthogonal to each other when the flexible circuit board is wrapped around the plurality of external surfaces of the support structure.

10. The device of claim 9, wherein the one or more accelerometers and the one or more gyroscopes are positioned on the plurality of panels such that at least a subset of the one or more accelerometers and the one or more gyroscopes are orthogonal to each other when the flexible circuit board is folded.

11. The device of claim 9, wherein the flexible circuit board comprises six panels and the support structure is a cube-shaped structure comprising six external faces, and wherein each of the six panels substantially covers a corresponding external face of the support structure when the flexible circuit board is folded.

12. The device of claim 11, wherein the one or more damping units comprise six damping units, each of the six damping units being in contact with a corresponding panel of the flexible circuit board.

13. The device of claim 7, wherein the one or more damping units are arranged relative to the sensing module such that an elastic center of the one or more damping units substantially coincides with a centroid of the sensing module.

14. A method for fabricating the inertial measurement device of claim 1, the method comprising:
providing the support structure; and
wrapping the flexible inertial sensor around the plurality of external surfaces of the support structure to substantially cover the plurality of external surfaces of the support structure, thereby forming the sensing module.

15. The method of claim 14, wherein the flexible inertial sensor comprises one accelerometer and three gyroscopes.

16. The method of claim 14, wherein the flexible inertial sensor comprises a front surface configured to a support the one or more accelerometers and one or more gyroscopes and a back surface opposite the front surface, and wherein the wrapping comprises wrapping the flexible inertial sensor around the plurality of external surfaces of support structure with the front surface facing the support structure and the back surface facing away from the support structure.

17. The method of claim 14, wherein the support structure comprises a plurality of grooves and each of the one or more accelerometers and the one or more gyroscopes is received within a respective groove of the plurality of grooves when the flexible inertial sensor is wrapped around the plurality of external surfaces of the support structure.

18. The method of claim 14, further comprising positioning the sensing module within a housing.

19. The method of claim 18, further comprising arranging one or more damping units between the sensing module and the housing.

20. The method of claim 19, further comprising mounting the housing onto an unmanned aerial vehicle.

21. The method of claim 19, wherein the flexible inertial sensor comprises a flexible circuit board, and wherein the one or more accelerometers and the one or more gyroscopes are each coupled to the flexible circuit board.

22. The method of claim 21, wherein the flexible circuit board comprises a plurality of panels, and wherein the wrapping comprises folding the flexible circuit board such that at least a subset of the plurality of panels are orthogonal to each other.

23. The method of claim 22, wherein the one or more accelerometers and the one or more gyroscopes are positioned on the plurality of panels such that at least a subset of the one or more accelerometers and the one or more gyroscopes are orthogonal to each other when the flexible circuit board is folded.

24. The method of claim 22, wherein the flexible circuit board comprises six panels and the support structure is a cube-shaped structure comprising six external faces, and wherein each of the six panels substantially covers a corresponding external face of the support structure when the flexible circuit board is folded.

25. The method of claim 24, wherein the one or more damping units comprise six damping units, and wherein the arranging comprises positioning each of the six damping units to be in contact with a corresponding panel of the flexible circuit board.

26. The method of claim 19, wherein the one or more damping units are arranged relative to the sensing module such that an elastic center of the one or more damping units substantially coincides with a centroid of the sensing module.

27. A movable device, the device comprising:
a sensing module comprising a support structure and a flexible inertial sensor, wherein the support structure comprises a plurality of external surfaces facing away from one another, and wherein the flexible inertial sensor is configured to wrap around the plurality of external surfaces of the support structure, such that the flexible inertial sensor substantially covers the plurality of external surfaces of the support structure, and wherein the flexible inertial sensor comprises one or more accelerometers and one or more gyroscopes; and
a carrier carrying the sensing module, wherein the flexible inertial sensor is configured to generate a signal indicative of at least one of an acceleration or a rotation of the carrier.

28. The device of claim 27, wherein the carrier is an unmanned aerial vehicle.

29. The device of claim 27, wherein the carrier is an aircraft, a watercraft, a car, or a robot.

30. The device of claim 27, further comprising a control computer operably coupled to the flexible inertial sensor and configured to receive and process the signal in order to determine at least one of the acceleration or the rotation of the carrier.

31. The device of claim 27, wherein the flexible inertial sensor comprises a front surface configured to a support the one or more accelerometers and one or more gyroscopes and a back surface opposite the front surface, and wherein the flexible inertial sensor wraps around the plurality of external surfaces of the support structure with the front surface facing the support structure and the back surface facing away from the support structure.

32. The device of claim 27, wherein the support structure comprises a plurality of grooves and each of the one or more accelerometers and the one or more gyroscopes is received within a respective groove of the plurality of grooves when the flexible inertial sensor is wrapped around the plurality of external surfaces of the support structure.

33. The device of claim 27, further comprising a housing containing therein said sensing module.

34. The device of claim 33, further comprising one or more damping units arranged between the sensing module and the housing.

35. The device of claim 34, wherein the flexible inertial sensor comprises a flexible circuit board, and wherein the one or more accelerometers and the one or more gyroscopes are each coupled to the flexible circuit board.

36. The device of claim 35, wherein the flexible circuit board comprises a plurality of panels, the flexible circuit board being foldable such that at least a subset of the plurality of panels are orthogonal to each other when the flexible circuit board is wrapped around the at least a portion of the support structure.

37. The device of claim 36, wherein the one or more accelerometers and the one or more gyroscopes are positioned on the plurality of panels such that at least a subset of the one or more accelerometers and the one or more gyroscopes are orthogonal to each other when the flexible circuit board is folded.

38. The device of claim 36, wherein the flexible circuit board comprises six panels and the support structure is a cube-shaped structure comprising six external faces, and wherein each of the six panels substantially covers a corresponding external face of the support structure when the flexible circuit board is folded.

39. The device of claim 38, wherein the one or more damping units comprise six damping units, each of the six damping units being in contact with a corresponding panel of the flexible circuit board.

40. The device of claim 34, wherein the one or more damping units are arranged relative to the sensing module such that an elastic center of the one or more damping units substantially coincides with a centroid of the sensing module.

41. The device of claim 3, wherein all of the one or more accelerometers and one or more gyroscopes supported by the flexible inertial sensor are coupled to the front surface.

42. The device of claim 4, wherein the one or more accelerometers and one or more gyroscopes are directed inwards, facing one another, while received within the plurality of grooves of the support structure.

43. The device of claim 1, wherein the plurality of external surfaces of the support structure comprises a first external surface and a second external surface adjacent the first external surface, and wherein the flexible inertial sensor comprises a single member that extends continuously over both the first external surface and the second external surface.

44. An inertial measurement system comprising:
the device of claim 1;
a housing configured to receive the sensing module therein; and
one or more damping units disposed in a space between the sensing module and the housing;
wherein the flexible inertial sensor is configured to wrap around the plurality of external surfaces of the support structure, such that the flexible inertial sensor is positioned between the support structure and the one or more damping units.

* * * * *